(12) United States Patent
Pattabhiraman et al.

(10) Patent No.: US 11,368,390 B2
(45) Date of Patent: Jun. 21, 2022

(54) NETWORK RECOVERY SYSTEMS AND METHODS

(71) Applicant: Arista Networks, Inc., Santa Clara, CA (US)

(72) Inventors: Bharathram Pattabhiraman, San Jose, CA (US); Swati Patel, Fremont, CA (US)

(73) Assignee: Arista Networks, Inc., Santa Clara, CA (US)

( * ) Notice: Subject to any disclaimer, the term of this patent is extended or adjusted under 35 U.S.C. 154(b) by 66 days.

(21) Appl. No.: 16/526,803

(22) Filed: Jul. 30, 2019

(65) Prior Publication Data

US 2021/0036952 A1 Feb. 4, 2021

(51) Int. Cl.
*H04L 45/28* (2022.01)
*H04L 45/16* (2022.01)
*H04L 12/46* (2006.01)
*H04L 9/40* (2022.01)
*H04L 47/80* (2022.01)

(52) U.S. Cl.
CPC .......... *H04L 45/28* (2013.01); *H04L 12/4641* (2013.01); *H04L 45/16* (2013.01); *H04L 47/806* (2013.01); *H04L 63/101* (2013.01)

(58) Field of Classification Search
CPC ..... H04L 45/28; H04L 45/16; H04L 12/4641; H04L 63/101; H04L 47/806
See application file for complete search history.

(56) References Cited

U.S. PATENT DOCUMENTS

| 9,264,302 | B2 | 2/2016 | Ernstrom et al. |
| 9,559,971 | B2* | 1/2017 | Curtis ................. H04L 41/0896 |
| 2011/0134791 | A1* | 6/2011 | So ....................... H04L 41/5009 398/25 |
| 2011/0164494 | A1* | 7/2011 | Kalyanjeet ............ H04L 45/586 370/219 |
| 2012/0033668 | A1* | 2/2012 | Humphries ........... H04L 45/245 370/390 |

(Continued)

FOREIGN PATENT DOCUMENTS

| EP | 3065379 A1 | 9/2016 |
| WO | 2019138414 A1 | 7/2019 |

OTHER PUBLICATIONS

International Search Report and Written Opinion for International Application No. PCT/US20/043790 dated Dec. 30, 2020, 12 pages.

*Primary Examiner* — Gary Mui
*Assistant Examiner* — Chuong M Nguyen
(74) *Attorney, Agent, or Firm* — Fountainhead Law Group P.C.

(57) ABSTRACT

A first network device is configured with a rule preventing network traffic from travelling from the first network device to one or more other network devices. The first network device is configured to receive and distribute network traffic to the one or more other network devices. A second network device receives and distributes network traffic to the one or more other network devices. The first network device determines that the second network device has failed. In response to determining that the second network device has failed, the first network device removes the rule so that the first network device receives and distributes network traffic to the one or more other network devices.

19 Claims, 10 Drawing Sheets

(56) References Cited

U.S. PATENT DOCUMENTS

| | | | |
|---|---|---|---|
| 2014/0003245 A1* | 1/2014 | Han | H04L 47/724 370/236 |
| 2015/0195093 A1* | 7/2015 | Mahadevan | H04L 12/1886 370/390 |
| 2016/0080285 A1* | 3/2016 | Ramachandran | H04L 41/0668 709/223 |
| 2017/0126587 A1 | 5/2017 | Ranns et al. | |
| 2019/0394066 A1* | 12/2019 | Lin | H04L 43/0817 |

* cited by examiner

FIG. 7

NETWORK RECOVERY SYSTEMS AND METHODS

BACKGROUND

The present disclosure relates generally to networking, and in particular, to systems and methods for recovering from a failure of one or more networking devices.

Modern network devices deliver data at ever increasing speeds. Indeed, some networks are used to stream content, such as movies, TV shows, sporting events, and the like. In modern networking applications, the network used to deliver data must be resilient. When a network device fails, the network must reroute the network traffic in such a way as to minimize the impact on the recipient. For example, for a network streaming application where a user may be watching a television show, if a network device fails, a new network device must pick up and deliver the traffic very quickly. Any delays in the recovery may be perceived by the user (e.g., as distortions in the video images), which results in a negative experience for the user. A variety of other applications may require data to be delivered fast and reliably even when network devices in the delivery path experience failures or outages.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions.

DETAILED DESCRIPTION

Described herein are techniques for a networking system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Figure 1:
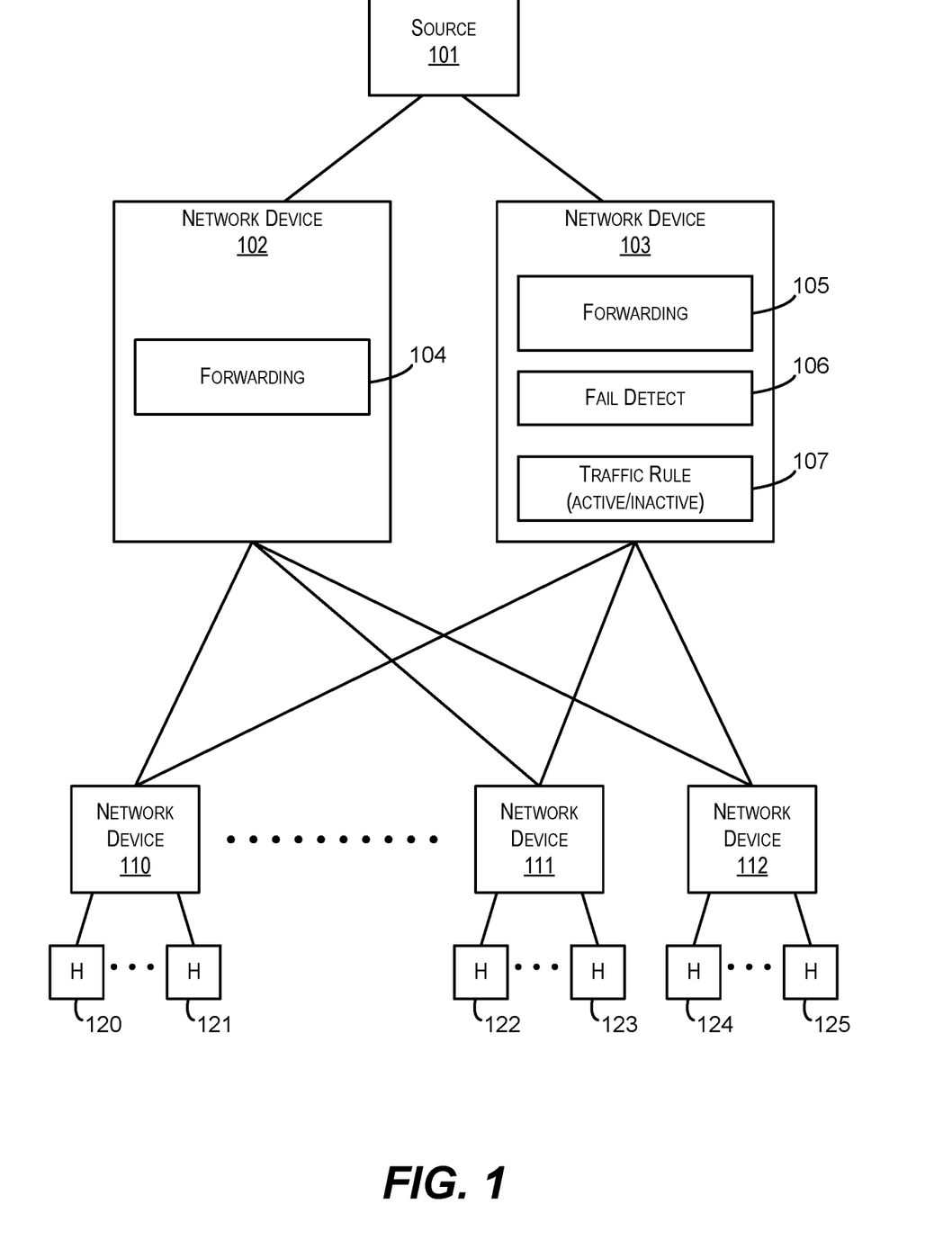
FIG. 1 illustrates network recovery according to an embodiment.

FIG. 1 illustrates network recovery according to an embodiment. In this example, two networking devices 102 and 103 are in a path between a network traffic source 101 and a plurality of other network devices 110-112. Here, network devices 110-112 may deliver network traffic from the source to hosts 120-125, for example. Features and advantages of the present disclosure include failure recovery techniques wherein when one of network devices 102 or 103 goes down (experiences a failure or outage), the other of network devices 102 or 103 delivers the network traffic to the other network devices 110-112 very quickly. The techniques described herein may be applied to various types of network devices, such as routers or network switches, for example.

For instance, network device 102 may be designated as a primary (or forwarding) device for receiving network traffic from source 101 and distributing the network traffic to network devices 110-112. Examples of various network traffic may include, but are not limited to, multicast network traffic or broadcast network traffic. Receiving and distributing the network traffic may include network device 102 programming forwarding instructions 104 (e.g., a routing table) so that pathways to particular destinations (e.g., particular network devices and/or hosts) may be determined, and data packets forwarded and delivered very quickly. If network device 102 fails, it may be desirable for network device 103 to deliver the network traffic to network devices 110-112.

Advantageously, while network device 102 is operational, network device 103 may be configured to receive the network traffic being delivered by network device 102 to the other network devices 110-113 and similarly program forwarding instructions 105. For example, network device 103 may be configured to receive and distribute network traffic in substantially the same manner as network device 102. Forwarding instructions 104 and 105 may route the network traffic received on network device 102 and network device 103 to the other network devices 110-112, for example. However, network device 103 may be configured with a rule 107 to prevent the network traffic from travelling from network device 103 to the other network devices 110-112. Rule 107 may be a drop rule to drop the network traffic without distributing such traffic, for example. In some embodiments, rule 107 may be an egress rule, such as a rule in an egress access control list (ACL). Accordingly, network device 102 may receive and deliver the traffic while network device 103 receives the traffic but does not deliver it.

When network device 102 fails, network device 103 may determine that network device 102 has failed. For example, a variety of techniques may be used for making such a determination, including bidirectional forwarding detection (BFD), protocol-independent multicast (PIM) hello, via a multi-chassis link aggregation group (MLAG) signal, or an Ethernet virtual private network (EVPN) update message indicating a failure, for example, as described in more detail below. In response to determining that network device 102 has failed, network device 103 may remove (e.g., delete or deactivate) the rule 107 so that network device 103 receives and distributes network traffic to the one or more other network devices 110-112.

Advantageously, in various embodiments, network device 103 may subscribe to the same network traffic that network device 102 is delivering to network devices 110-112. Network device 103 may program the same or overlapping forwarding rules as network device 102. The forwarding rules route the network traffic received on network device 102 to the other network devices 110-112 and similarly route the network traffic received on network device 103 to the other network devices 110-112. However, even though network device 103 receives the network traffic and is programmed to route the network traffic, rule 107 prevents the network traffic from being delivered. When network device 102 fails, however, network device 103 is ready to deliver network traffic immediately (e.g., without time consuming configuration of routing tables and other delivery information), and the network traffic may resume very quickly, for example. By receiving the same network traffic to be delivered and by building forwarding information 105, in various example embodiments, network device 103 may not have to wait to resume traffic delivery, which reduces the recovery time to get the network traffic flowing after a failure, for example.

Figure 2:
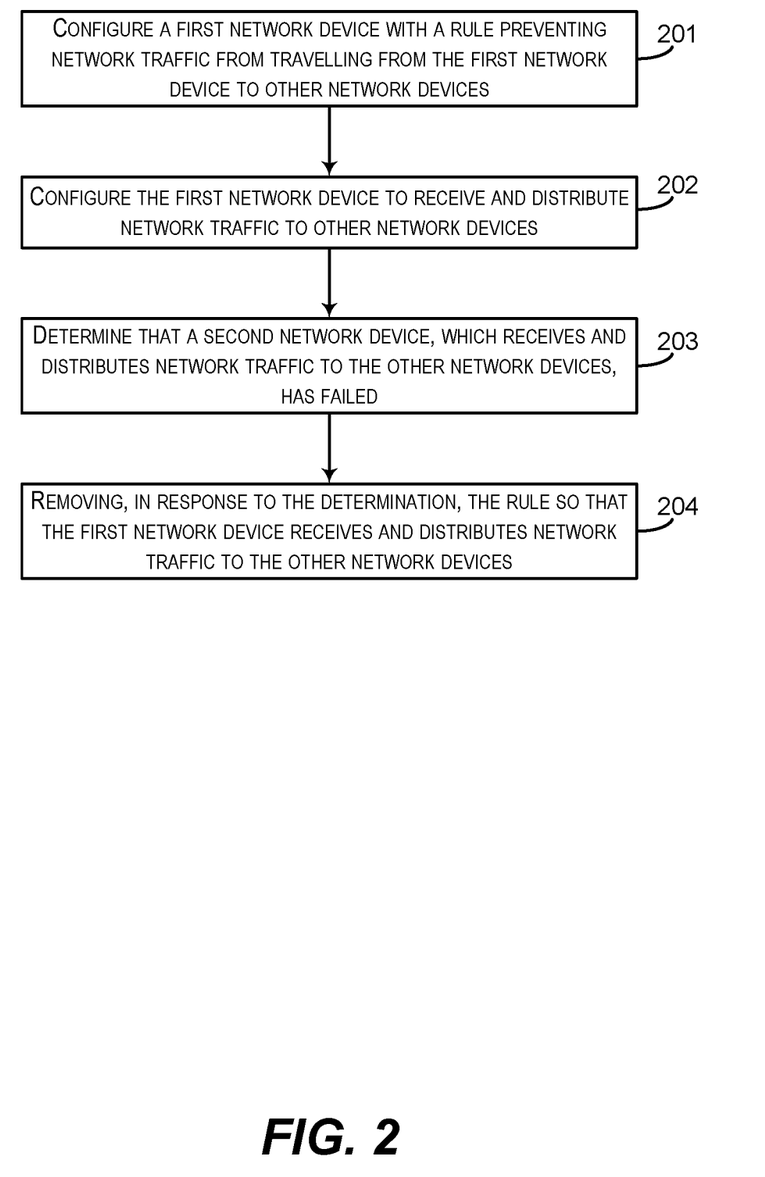
FIG. 2 illustrates a network recovery method according to an embodiment.

FIG. 2 illustrates a network recovery method according to an embodiment. At 201, a first network device is configured with a rule preventing network traffic from travelling from the first network device to other network devices (e.g., downstream). At 202, the first network device is configured to receive and distribute network traffic to the other network devices downstream, for example. A second network device is similarly configured to receive and distribute the network traffic to the other network devices downstream, for example. In some example embodiments, the first and second network devices may receive the same data to be distributed to downstream network devices, and the two network devices may be programmed with the same routing information, but the rule in the first network device prevents the first network device from sending the network traffic to the downstream network devices, for example. At some point in time, the second network device may fail. At 203, the first network device determines that the second network device has failed. As mentioned above and described in more detail below, such a determination may be made by monitoring BFD or PIM Hello packets, for example. At 204, in response to determining that the second network device has failed, the rule is removed so that the first network device now receives and distributes network traffic to the one or more other network devices. By configuring the first network device to receive the traffic, and configuring the first network device with all, or nearly all, of the information needed to deliver the traffic, for example, a network according to various example embodiments may recover with a delay of only the time to detect the failure and time to delete the rule. Accordingly, the network may recover very fast compared with requiring the first network device to obtain the traffic, to program the forwarding paths, and then to deliver the traffic, for example.

In some embodiments, the first network device (aka, the failover device or recovery device) may also be a forwarding device for at least a portion of the one or more other network devices (e.g., where a receiving VLAN performed a PIM join requesting traffic from the recovery device or where a non-designated device is an assert winner). Where the first network device is determined to be forwarding traffic, the above described process may prevent the first network device from being configured with the first rule when the first network device is the designated forwarding device. In some cases, this may occur prior to configuring the first network device with the rule. In other cases, the rule may be removed if the first network device becomes a forwarding device, for example.

Figure 3A:
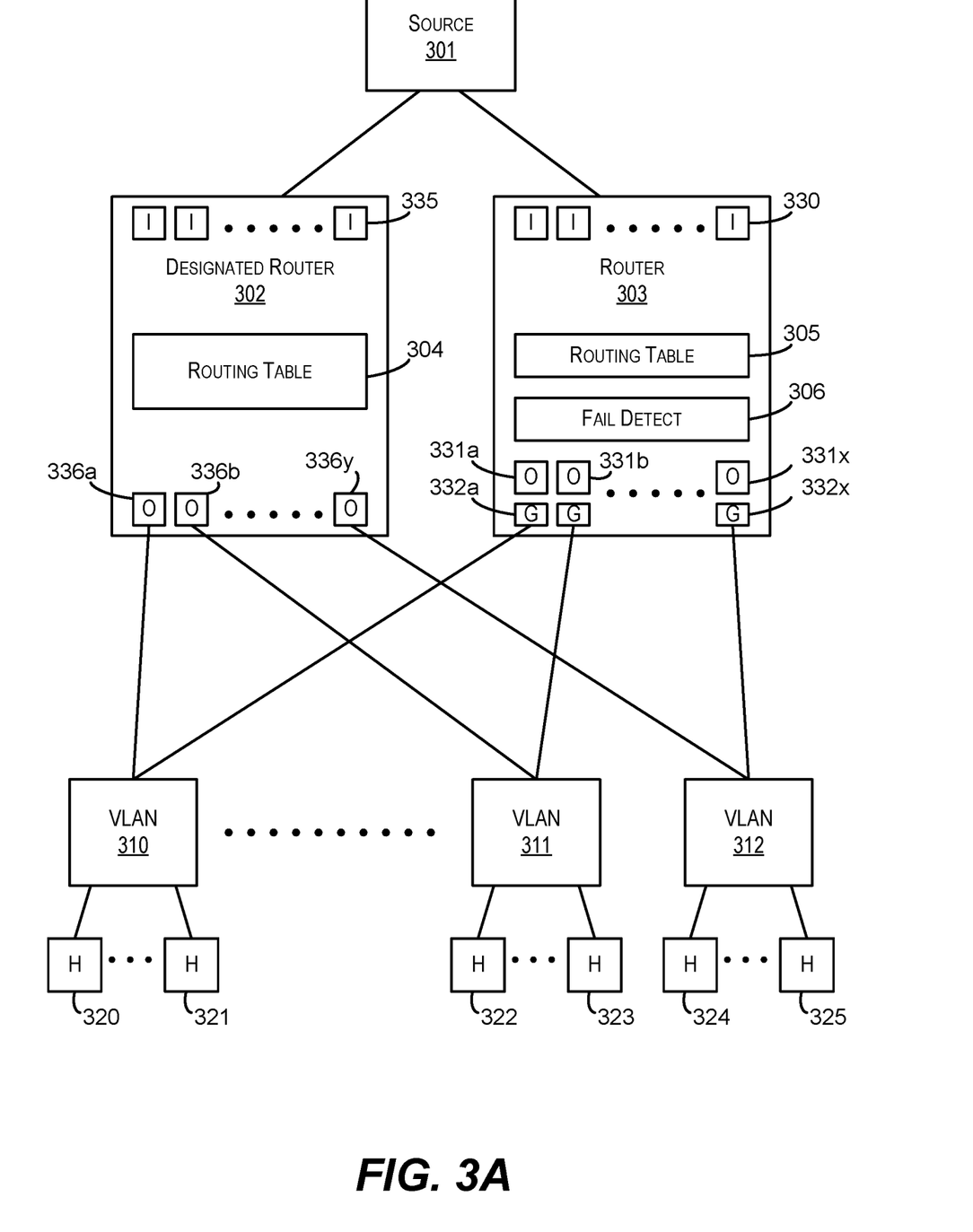
FIG. 3A illustrates a configuration of routers according to an embodiment.

FIG. 3A illustrates a configuration of routers according to an embodiment. In this example, network devices include routers. In this example, routers 302 and 303 are distributing multicast traffic from source 301 to virtual local area networks (VLANs) 310-312. Router 302 may be the designated router (DR), for example, which is designated to send traffic to the downstream devices. When one router fails, the other router may take over distribution of network traffic very quickly. In various example embodiments, programming routes and interfaces may be configured in each router's hardware. For example, designated router 302 may include incoming interfaces 335 and router 330 may include incoming interfaces 330. One or more of the incoming interfaces 335 on router 302 may be programmed to receive network traffic from source 301, such as multicast network traffic, for example. Likewise, one or more of the incoming interfaces 330 on router 303 may be programmed to receive the same network traffic as router 302 from source 301, for example. Each router 302 and 303 may configure a routing table 304 and 305 (e.g., in a content addressable memory or "CAM") to distribute network traffic to VLANs 310-312. One or more of the outgoing interfaces 336a-y on designated router 302 may be programmed to distribute (e.g., forward) network traffic to VLANs 310, 311, and 312, for example. Likewise, one or more of the outgoing interfaces 331a-x on router 303 may be programmed to distribute the same network traffic to VLANs 310, 311, and 312, for example. However, outgoing interfaces distributing redundant traffic to VLANs also receiving traffic from router 302 may be blocked (e.g., traffic may be dropped) by one or more rules 332a-x, for example. A rule may act as a gate (G) preventing traffic from going out of an output interface of router 303, for example. In one embodiment a rule is included as one or more entries in an access control list (ACL) associated with an egress port of router 303, for example. Egress ACLs are one example mechanism for preventing the network traffic from travelling from a network device to the one or more other network devices as described herein. The following is one example of an ACL, where the first line drops multicast traffic and the second line allows other traffic:

IP Access List pim-non-dr-drop-rules
        10 deny ip any 224.0.0.0/4
        20 permit ip any any Accordingly, when designated router 302 is operational, network traffic from source 301 is received by both routers, but distributed downstream to VLANs 310-312 by router 302 and not router 303.

Figure 3B:
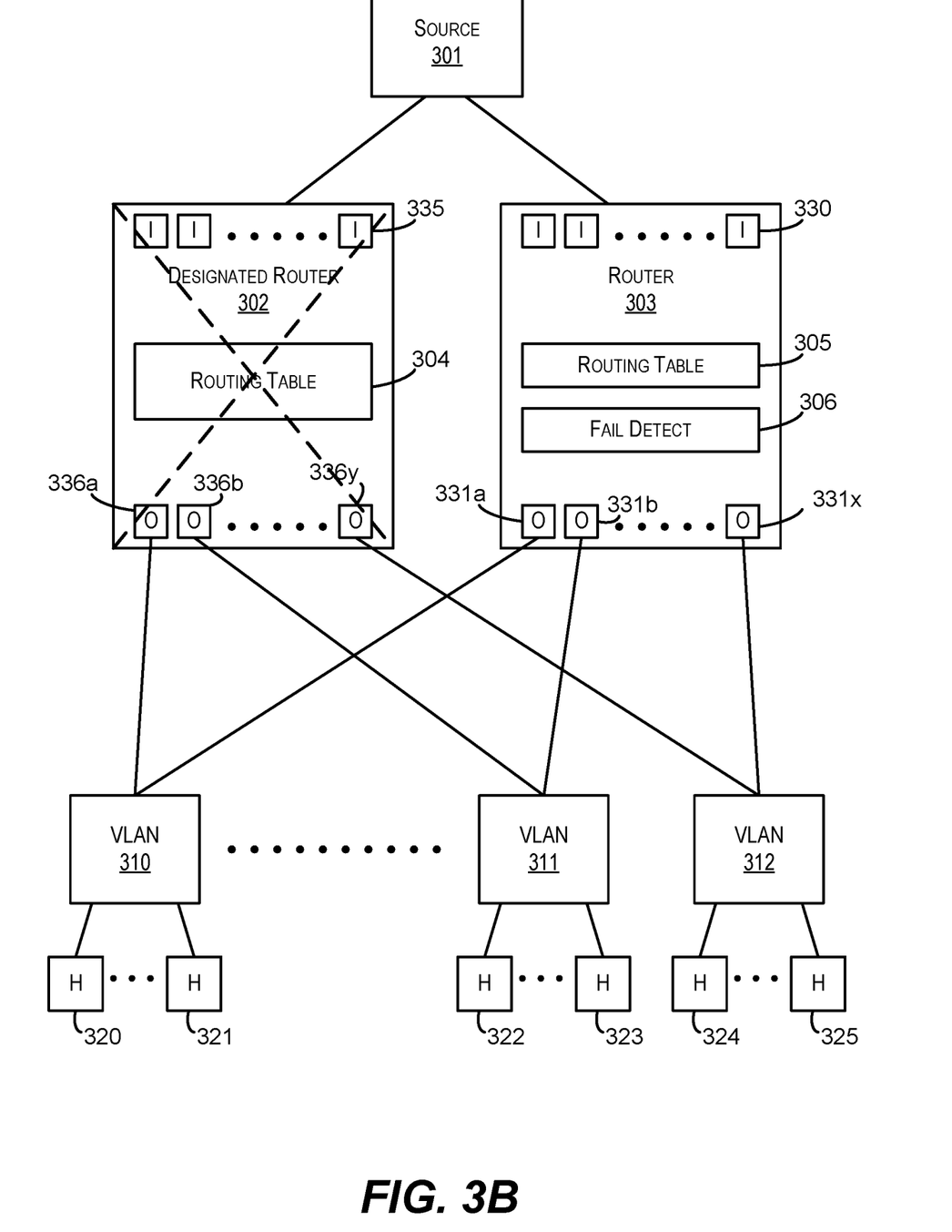
FIG. 3B illustrates recovery of routers according to an embodiment.

FIG. 3B illustrates recovery of routers according to an embodiment. Here, router 302 has experienced a failure and stops delivering traffic. Router 303 includes a fail detection component 306, which may detect failure of another router (e.g., the designated router) by monitoring network packets sent over the network or information sent directly between the two routers. Accordingly, router 303 may determine that router 302 has failed. Once router 303 determines that router 302 has failed, router 303 removes the one or more rules and traffic delivery to VLANs 310-312 resumes. Router 303 may become the designated router for delivering traffic after determining that the second router has failed, for example. In one embodiment, if multiple routers 303 are configured to deliver traffic (e.g., redundantly with blocking rules) to the same downstream devices, the routers may perform a selection process to determine which router becomes the new designated router. In that case, rules may be implemented to block traffic on multiple routers and the newly appointed designated router would remove the rule.

Figure 3C:
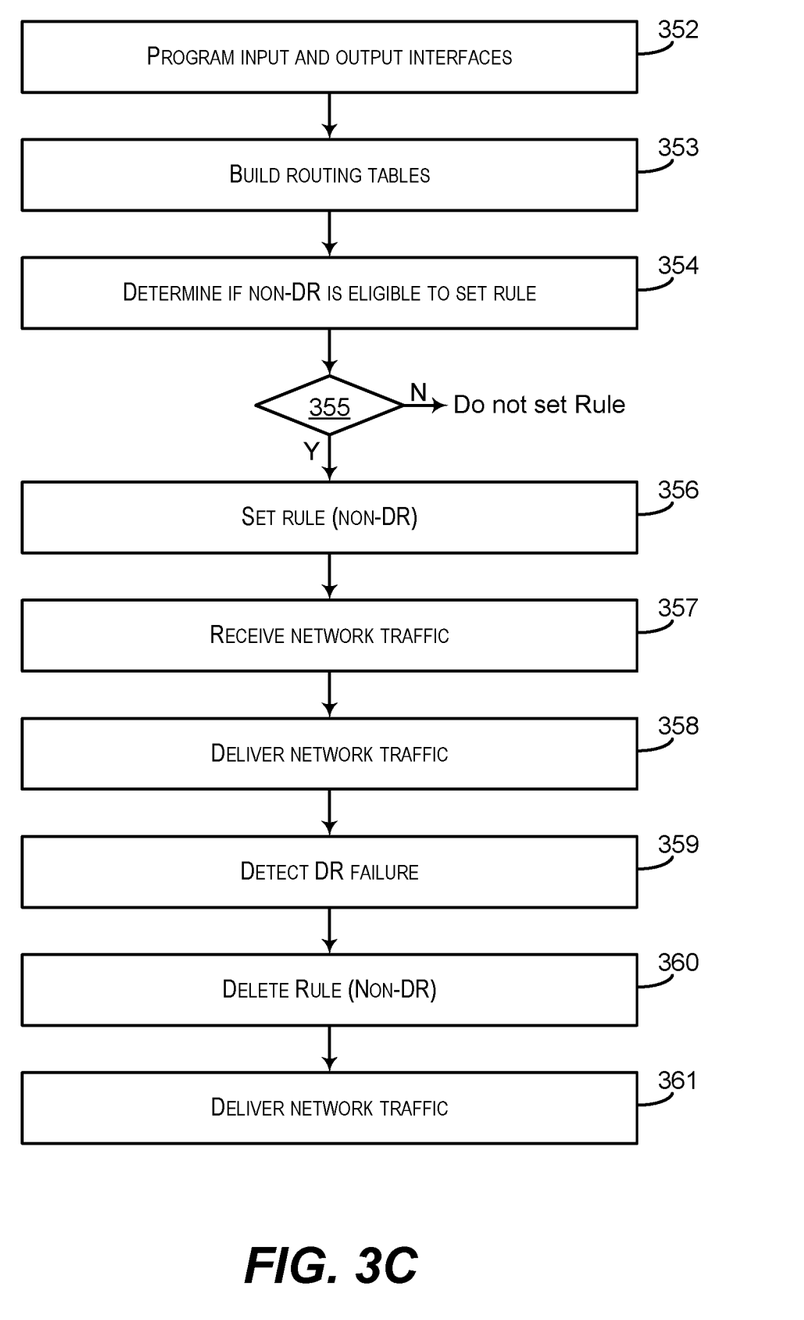
FIG. 3C illustrates a process flow chart according to another example embodiment.

FIG. 3C illustrates a process flow chart according to another example embodiment. At 352, the input and output interfaces may be programmed in each router. At 352, each router may build routing tables. At 354, the non-designated router (non-DR) (e.g., router 303) may determine if it is eligible to set a rule blocking traffic. In one embodiment, the non-DR may determine if it is forwarding traffic to the downstream devices. If not, then no rule is set. However, if the non-DR is determined to be eligible to set the rule (at 355), then the rule is set at 356. At 357, each router receives network traffic. At 358, the DR delivers the network traffic. At 359, the DR fails and the non-DR detects the DR failure. At 360, the non-DR deletes the rule, and at 361 the non-DR (which may be re-designated as the DR) delivers the network traffic.

Figure 4A:
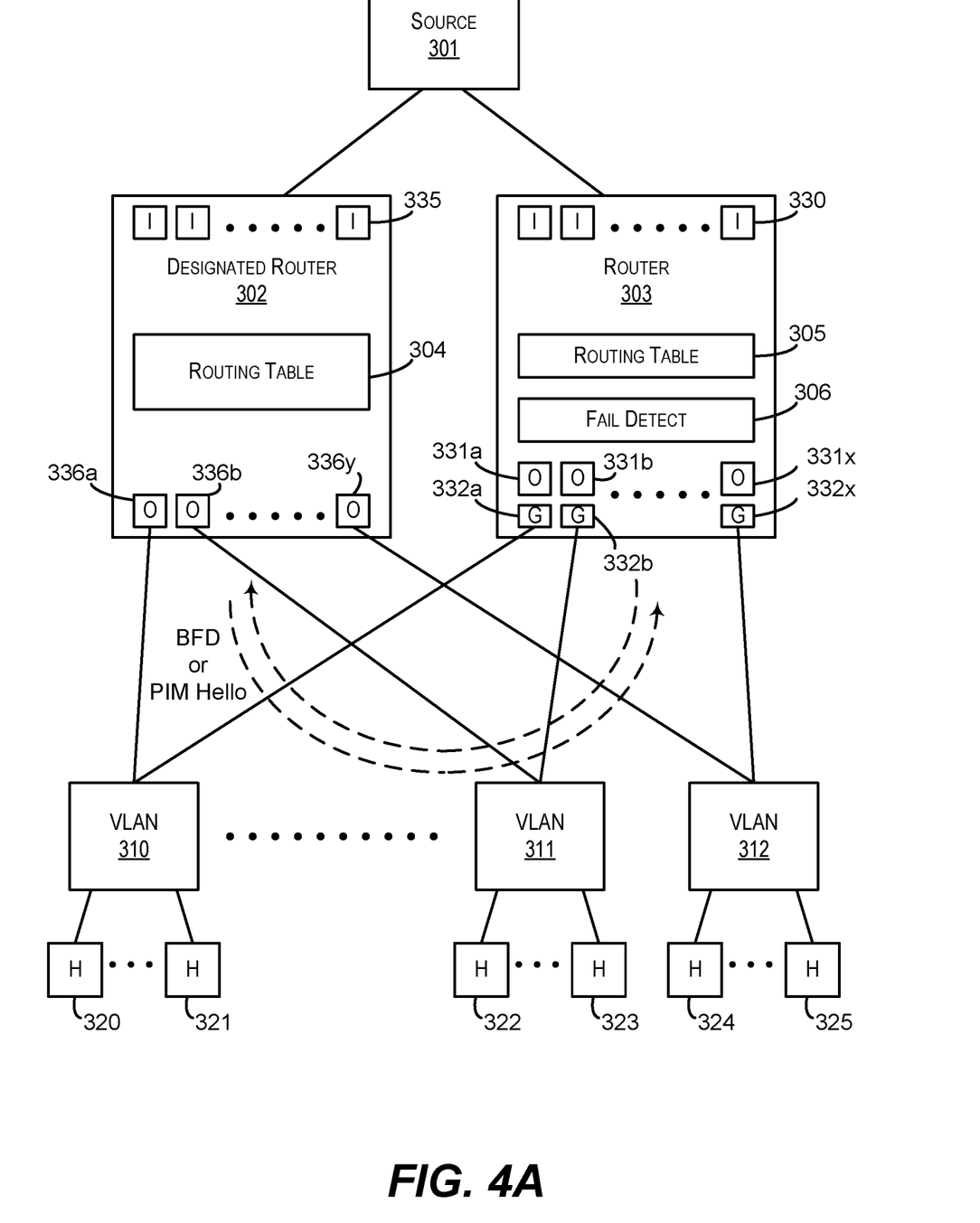
FIG. 4A illustrates recovery in response to packet failure indications according to various embodiments.

FIG. 4A illustrates recovery in response to packet failure indications according to various embodiments. As mentioned above, the techniques described herein may be used in a variety of network devices, such as routers or switches. In this example, routers 302 and 303 are configured to receive and distribute traffic from source 301 as described above with respect to FIG. 3A-B. In this example, fail detect 306 monitors packets to determine if the DR has failed. For example, fail detect 306 may monitor bidirectional forwarding detection (BFD) packets or protocol-independent multicast (PIM) hello packets across the network, for example. BFD is a network protocol that is used to detect faults between two forwarding engines connected by a link or indirectly connected by a switch, for example. Alternatively, routing devices may send hello messages at a fixed interval on all PIM-enabled interfaces ("PIM hello"). By using hello messages, routing devices advertise their existence as PIM routing devices on the subnet. With PIM-enabled routing devices advertised, a single designated router for the subnet may be established and monitored for failures.

Figure 4B:
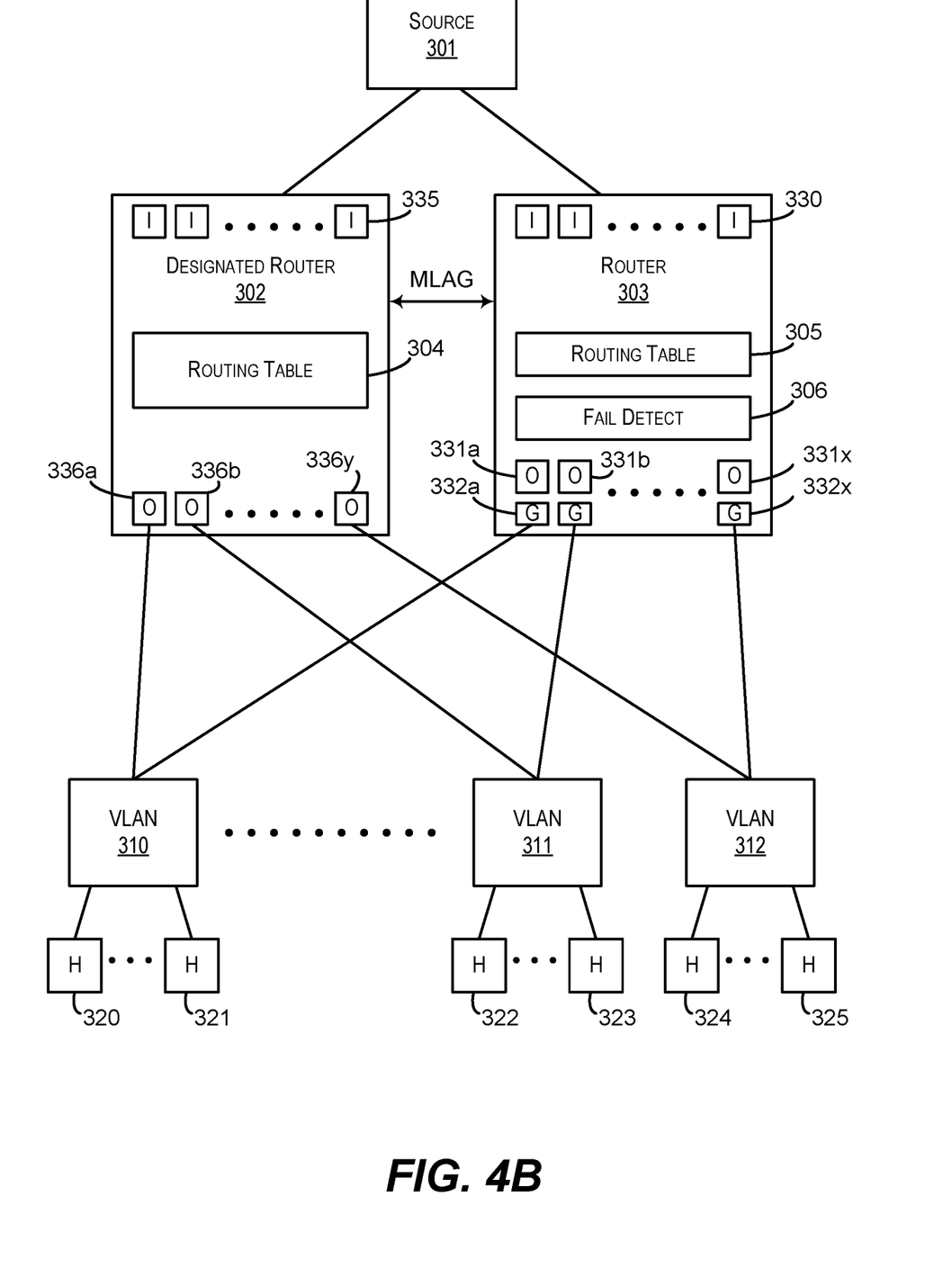
FIG. 4B illustrates recovery in response to an MLAG signal according to an embodiment.

FIG. 4B illustrates recovery in response to an MLAG signal according to an embodiment. In this example, fail detect 306 monitors information sent directly between the two routers to determine that the DR has failed. In this example, determining that the DR has failed comprises receiving a multi-chassis link aggregation group (MLAG) signal indicating a failure. MLAG (aka MC-LAG) multi-chassis link aggregation group, is a type of link aggregation group (LAG) with constituent ports that terminate on separate chassis, which in some example embodiments may be used primarily for the purpose of providing redundancy in the event one of the chassis fails. In various embodiments, gates 332a-x (labeled) "G" may affect multicast traffic that is routed to a VLAN. However, multicast traffic that is bridging within a VLAN may not be dropped by the gate G.

Figure 5:
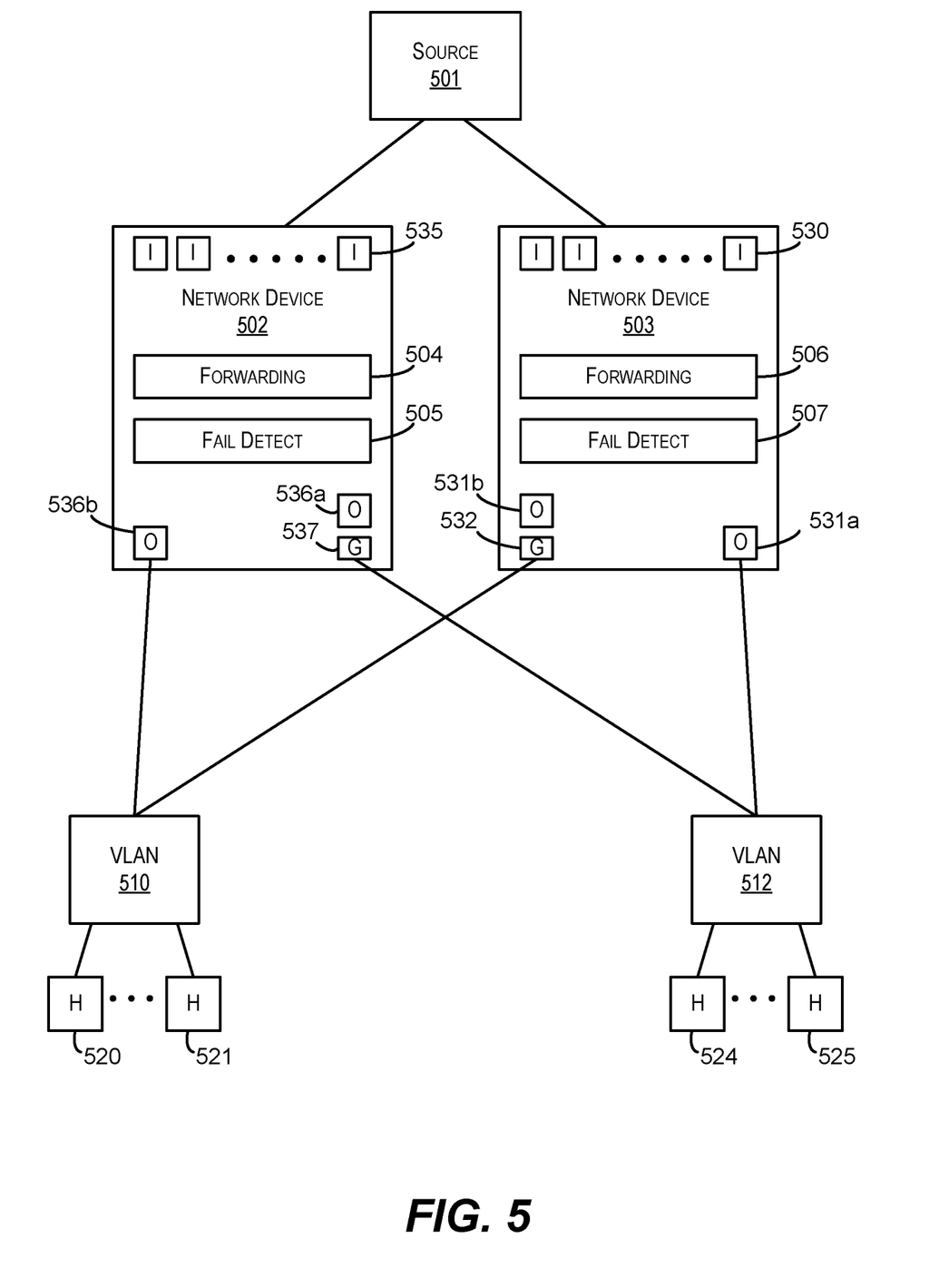
FIG. 5 illustrates recovery of routers according to another embodiment.

FIG. 5 illustrates recovery of network devices according to another embodiment. In this example, network device 502 may receive network traffic from source 501 on one or more incoming (aka input) interfaces 535 and send the network traffic to one or more VLANs 510 and hosts 520-521 over one or more outgoing (aka output) interfaces 536b based on forwarding information 504. Similarly, network device 503 may receive network traffic from source 501 on one or more incoming (aka input) interfaces 530 and send the network traffic to one or more VLANs 512 and hosts 524-525 over one or more outgoing (aka output) interfaces 531 based on forwarding information 506. Accordingly, network device 502 may be the designated device for sending traffic to VLANs 510 and network device 503 may be the designated device for sending traffic to VLANs 512. Accordingly, in this example, network device 503 may receive the same traffic as network device 502 to be sent to VLANs 510 and network device 502 may receive the same traffic as network device 503 to be sent to VLANs 512. Network devices 502 and 503 may include forwarding information for distributing network traffic for which they are not the designated network device, which is in addition to the forwarding information they use for distributing traffic for which they are the designated network device. Additionally, in this example, network device 503 includes an output interface 531b configured to send traffic to VLANs 510 and a rule 532 blocking such traffic. Similarly, in this example, network device 502 includes an output interface 536a configured to send traffic to VLANs 512 and a rule 537 blocking such traffic.

Further, network devices 502 and 503 include fail detect components 505 and 507, respectively. Accordingly, when network device 503 detects that network device 502 has failed, network device 503 removes rule 532 and delivers traffic to VLANs 510 and hosts 520-521. Similarly, when network device 502 detects that network device 503 has failed, network device 502 removes rule 537 and delivers traffic to VLANs 512 and hosts 524-525.

Figure 6:
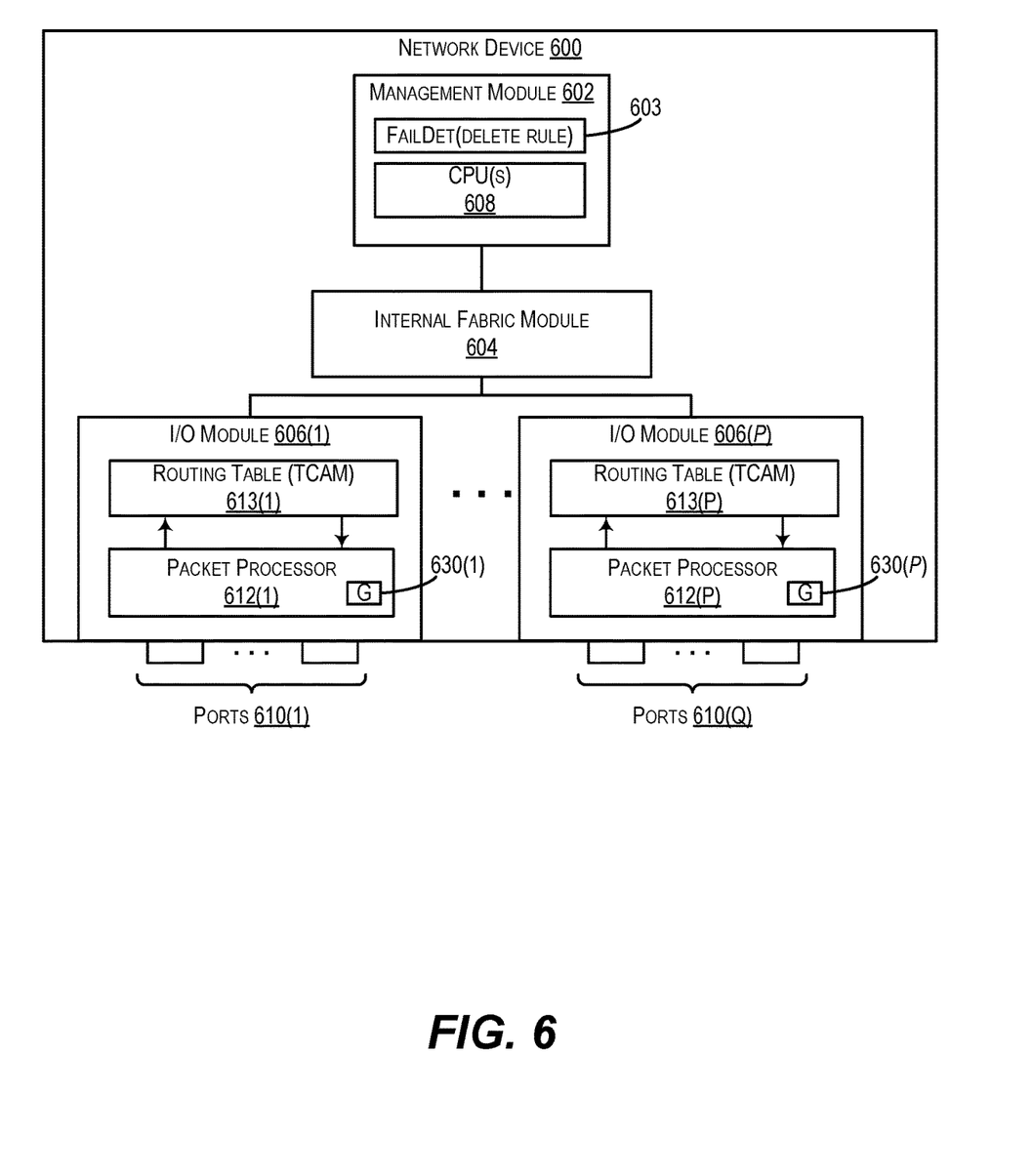
FIG. 6 illustrates one example hardware and software configuration of a router according to an embodiment.

FIG. 6 depicts an example network device (e.g., a network switch and/or router) 600 that may be used to implement a network device 103 of FIG. 1 in certain embodiments. Example embodiments of network devices may be implemented, at least in part, via one or more ASICs and/or other hardware processing elements.

As shown, network device 600 includes a management module 602, an internal fabric module 604, and a number of I/O modules 606(1)-606(P). Management module 602 includes one or more management CPUs 608 for managing/controlling the operation of the device. Each management CPU 608 can be a general purpose processor, such as an Intel/AMD x86 or ARM-based processor, for example, that operates under the control of software stored in an associated memory (not shown). Management module 602 may include a component (e.g. software executed by CPU 608) that may determine if another network device has failed and remove (e.g., deletes) a rule so that the network device receives and distributes network traffic to the one or more other network devices.

Internal fabric module 604 and I/O modules 606(1)-606(P) collectively represent the data, or forwarding, plane of network device 600. Internal fabric module 604 is configured to interconnect the various other modules of network device 600. Each I/O module 606(1)-606(P) includes one or more input/output ports 610(1)-610(Q) that are used by network device 600 to send and receive network packets. Each I/O module 606(1)-606(P) can also include a packet processor 612(1)-612(P). Packet processor 612(1)-612(P) is a hardware processing component (e.g., an ASIC) that can make wire speed decisions on how to handle incoming or outgoing network packets. In certain embodiments, one or more of the techniques described in the present disclosure may be implemented wholly, or in part, within packet processors 612(1)-612(P). For example, in one embodiment, one or more rules 630(1)-630(P) may be set or removed by management module 602 in packet processors 612(1)-612(P), for example. In this example, I/O module 606(1)-606(P) further includes a routing table 613(1)-613(P), which may include a content addressable memory (CAM, such as a TCAM).

It should be appreciated that network device 600 is illustrative and many other configurations having more or fewer components than network device 600 are possible.

Figure 7:
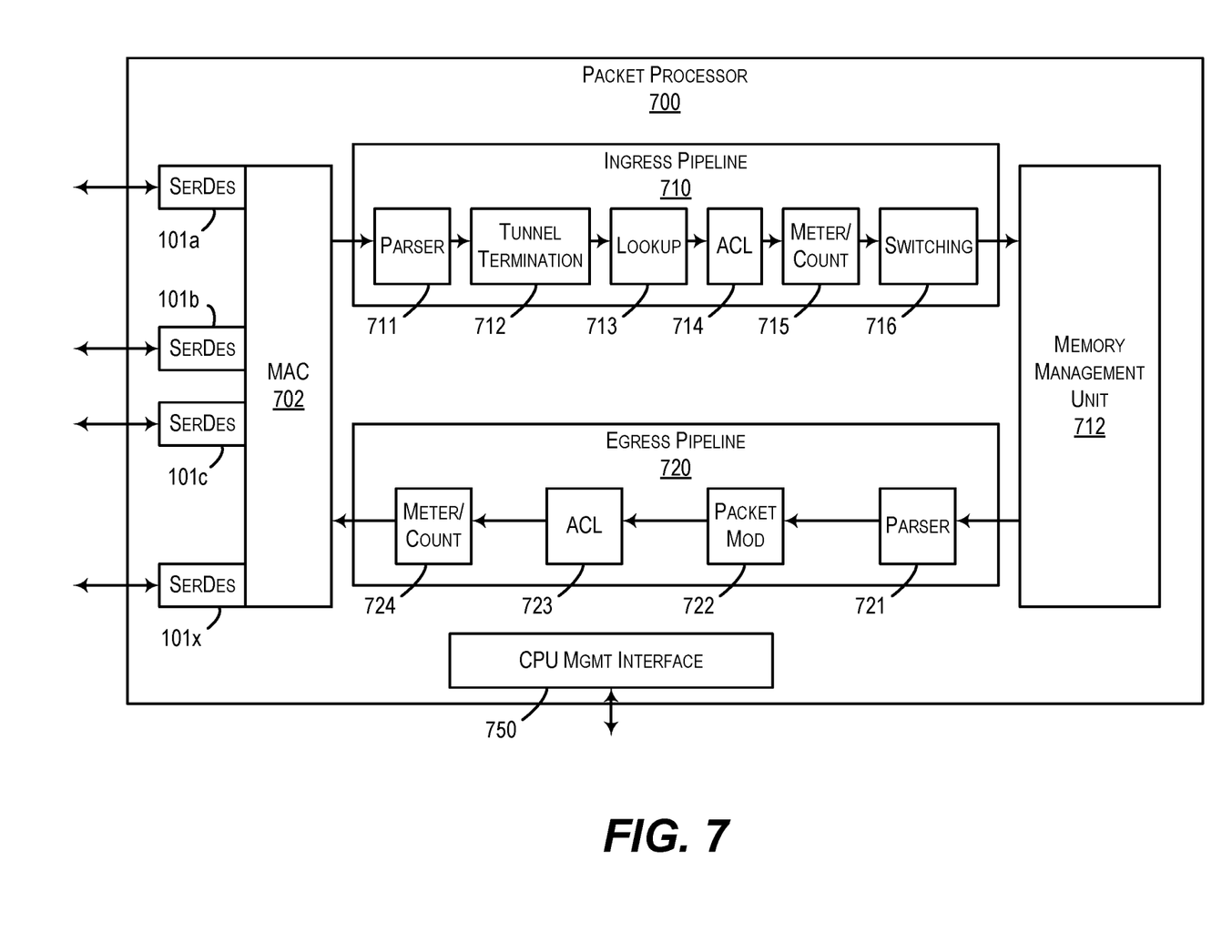
FIG. 7 illustrates an example packet processor according to an embodiment.

FIG. 7 illustrates an example packet processor 700 according to an embodiment. Network devices according to various embodiments may receive, process, and transmit packets using header information. Such devices may use specialized "forwarding" or "switch" chips, such as packet processor 700, to process incoming packets fast enough to keep up with modern, high-speed networking protocols. The packet-processing structures inside packet processor 700 are often called a "pipeline." In various embodiments, packet processor 700 may be responsible for receiving a packet from an input port, determining where the packet is destined, and sending it out an output port. However, network switches may provide many other functions besides basic forwarding. Packet processor 700 may include numerous serializer-deserializers ("SerDes") 101a-x, which receive (or send) data to (or from) a media access controller (MAC) 702, for example. MAC 702 is coupled to pipelines containing numerous "stages," with each stage responsible for applying a variety of services to the packet. For example, packet processor 700 may comprise an "ingress" pipeline 710 and an egress pipeline 720. Ingress pipeline 710 may apply services to incoming packets before their next destination has been definitively determined. Egress pipeline 720 may apply services to packets that are being transmitted to their next destination. Ingress pipeline 710 and egress pipeline 720 typically contain numerous stages, and each may provide a variety of services by looking up information using the packet header (or the results of prior lookups). For example, ingress pipeline 710 may include parser 711, tunnel termination 712, lookup (e.g., TCAM/SRAM), an ingress Access Control List 714 (aka "ACL" or ACL Content Aware Engine, sometimes referred to as, "ICAP"), Metering and Counting 715, and switching 716. ACL 714, along with Metering and Counting 715 may perform physical port services such as policy-based routing ("PBR"), quality-of-service ("QoS"), and/or Storm Control, for example. Ingress pipeline 710 may be coupled to a memory management unit 712, which may provide flexible queuing and scheduling, for example. Memory management unit 712 is further coupled to egress pipeline 720. Egress pipeline 720 may include parser 721, packet modification 722, egress ACL 723, and Metering and Counting 724. Egress ACL 723 may be configured with rules as described above (for example rules 332a-x in FIG. 3) to prevent the output of particular multicast or broadcast traffic, for example. The rules in egress ACL 723 may be configured by management software running on a CPU and received in packet processor 700 over a CPU management interface 750, for example. In other embodiments, such rules 332a-x may be programmed into ACL 714 as part of the ingress pipeline.

Some embodiments may be implemented in a non-transitory computer-readable storage medium for use by or in connection with the instruction execution system, apparatus, system, or machine. The computer-readable storage medium contains instructions for controlling a computer system to perform the techniques described by various embodiments above. The computer system may include one or more computing devices. The instructions, when executed by one or more computer processors, may be configured to perform that which is described in various embodiments above.

Further Examples

In one embodiment, the present disclosure includes a network device comprising one or more processors and a non-transitory computer-readable storage medium having stored thereon computer executable instructions, wherein the instructions, when executed by the network device, cause the network device to be operable to: configure the network device with a first rule, the first rule preventing at least a first portion of network traffic from travelling from the network device to one or more other network devices; configure the network device to receive and distribute the first portion of network traffic to the one or more other network devices, wherein a second network device receives and distributes the first portion of network traffic to the one or more other network devices; determine that the second network device has failed; and in response to determining that the second network device has failed, remove the first rule so that the network device receives and distributes the first portion of network traffic to the one or more other network devices.

In another embodiment, the present disclosure includes a network device comprising: one or more input interfaces configured to receive network traffic from a source; one or more output interfaces configured to distribute the network traffic to one or more other network devices; a first rule, the first rule configured to prevent the network traffic from travelling from said network device to the one or more other network devices when a second network device is designated to receive and to distribute the network traffic to the one or more other network devices; and a designated device failure detector configured to determine that the second network device has failed, and in response to determining that the second network device has failed, remove the first rule so that said network device receives and distributes network traffic to the one or more other network devices.

In another embodiment, the present disclosure includes network device comprising: one or more input interfaces configured to receive network traffic from a source; one or more output interfaces configured to distribute the network traffic to one or more other network devices; means for preventing the network traffic from travelling from said network device to the one or more other network devices when a second network device is designated to receive and to distribute the network traffic to the one or more other network devices; and means for determining that the second network device has failed, and in response to determining that the second network device has failed, removing the first rule so that said network device receives and distributes network traffic to the one or more other network devices.

In another embodiment, the present disclosure includes a non-transitory computer-readable storage medium having stored thereon computer executable instructions for performing a method of configuring a network device, wherein the instructions, when executed by said network device, cause said network device to be operable for: configuring said network device with a first rule, the first rule preventing network traffic from travelling from said network device to one or more other network devices; configuring said network device to receive and distribute network traffic to the one or more other network devices as a failsafe to a second network device that receives and distributes network traffic to the one or more other network devices; determining that the second network device has failed; and in response to determining that the second network device has failed, removing the first rule so that the first network device receives and distributes network traffic to the one or more other network devices.

In another embodiment, the present disclosure includes a method of configuring a first network device comprising: configuring the first network device with a first rule, the first rule preventing network traffic from travelling from the first network device to one or more other network devices;

configuring the first network device to receive and distribute network traffic to the one or more other network devices, wherein a second network device receives and distributes network traffic to the one or more other network devices; determining that the second network device has failed; and in response to determining that the second network device has failed, removing the first rule so that the first network device receives and distributes network traffic to the one or more other network devices.

In other embodiments, the above describe embodiments may further include the following alone or in various combinations.

In various embodiments, the first portion of network traffic received by the network device is the same first portion of network traffic received by the second network device.

In various embodiments, configuring the network device to receive and distribute the first portion of network traffic to the one or more other network devices comprises: programming an incoming interface of the network device to receive the same network traffic as the second network device; and programming an outgoing interface of the network device to forward the same network traffic as the second network device.

In various embodiments, the above described embodiments further comprise programming forwarding instructions in the first network device and the second network device, the forwarding instructions routing the network traffic received on the first network device and the second network device to the one or more other network devices.

In various embodiments, the first rule prevents network traffic from going out of an output interface of the first network device.

In various embodiments, the first rule comprises a rule to drop the network traffic.

In various embodiments, the first rule comprises an entry in an access control list associated with an egress port of the first network device.

In various embodiments, the above describe embodiments further comprise determining if the first network device is a forwarding device for at least a portion of the one or more other network devices, the first network device is not configured with the first rule when the first network device is the designated forwarding device.

In various embodiments, the network device is a first router and the second network device is a designated router, and wherein the first router becomes the designated router after determining that the second router has failed.

In various embodiments, the network traffic is multicast network traffic or broadcast network traffic.

In various embodiments, determining that the second network device has failed comprises monitoring bidirectional forwarding detection packets.

In various embodiments, determining that the second network device has failed comprises monitoring protocol-independent multicast (PIM) hello packets.

In various embodiments, determining that the second network device has failed comprises receiving a multi-chassis link aggregation group signal indicating a failure.

In various embodiments, determining that the second network device has failed comprises receiving an Ethernet virtual private network (EVPN) message indicating a failure.

In various embodiments, the one or more other network devices comprise at least a first virtual local area network and a second virtual local area network, wherein the first network device is designated to forward first network traffic to the first virtual local area network and the second network device is designated to forward second network traffic to the second virtual local area network, and wherein, in response to determining that the second network device has failed, the first network device receives and distributes the second network traffic to the second virtual local area network.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method performed by a network device comprising: configuring the network device with a first rule, the first rule preventing at least
   a first portion of network traffic from travelling from the network device to one or more other network devices;
   configuring the network device to receive and distribute the first portion of network traffic to the one or more other network devices, wherein:
   the first portion of network traffic is received at an incoming interface of the network device,
   the first portion of network traffic is not provided to the one or more other network devices by an outgoing interface of the network device based on the first rule, and
   a second network device receives and distributes the first portion of network traffic to the one or more other network devices;
   determining that the second network device has failed; and
   in response to determining that the second network device has failed, removing the first rule so that the network device distributes the first portion of network traffic to the one or more other network devices.

2. The method of claim 1 wherein the first portion of network traffic received by the network device is the same first portion of network traffic received by the second network device.

3. The method of claim 1 wherein configuring the network device to receive and distribute the first portion of network traffic to the one or more other network devices comprises:
   programming an incoming interface of the network device to receive the same network traffic as the second network device; and
   programming an outgoing interface of the network device to forward the same network traffic as the second network device.

4. The method of claim 1 further comprising programming forwarding instructions in the network device and the second network device, the forwarding instructions routing the network traffic received on the network device and the second network device to the one or more other network devices.

5. The method of claim 1 wherein the first rule prevents the first portion of network traffic from going out of an output interface of the network device.

6. The method of claim 1 wherein the first rule comprises a rule to drop the first portion of network traffic.

7. The method of claim 1 wherein the first rule comprises an entry in an access control list associated with an egress port of the network device.

8. The method of claim 1 further comprising determining if the network device is a forwarding device for at least a portion of the one or more other network devices, wherein the network device is not configured with the first rule when the network device is the forwarding device.

9. The method of claim 1 wherein the network device is a first router, and the second network device is a designated router, and wherein the first router becomes the designated router after determining that the second network device has failed.

10. The method of claim 1 wherein the network traffic is multicast network traffic or broadcast network traffic.

11. The method of claim 1 wherein determining that the second network device has failed comprises monitoring bidirectional forwarding detection packets.

12. The method of claim 1 wherein determining that the second network device has failed comprises monitoring protocol-independent multicast (PIM) hello packets.

13. The method of claim 1 wherein determining that the second network device has failed comprises receiving a multi-chassis link aggregation group signal indicating a failure.

14. The method of claim 1 wherein determining that the second network device has failed comprises receiving an Ethernet virtual private network (EVPN) message indicating a failure.

15. The method of claim 1 wherein the one or more other network devices comprise at least a first virtual local area network and a second virtual local area network, wherein the network device is designated to forward first network traffic to the first virtual local area network and the second network device is designated to forward second network traffic to the second virtual local area network, and wherein, in response to determining that the second network device has failed, the network device receives and distributes the second network traffic to the second virtual local area network.

16. A network device comprising:
one or more input interfaces configured to receive network traffic from a source; one or more output interfaces configured to distribute the network traffic to one or more other network devices;
a first rule, the first rule configured to prevent the network traffic from travelling from said network device to the one or more other network devices when a second network device is designated to receive and to distribute the network traffic to the one or more other network devices, wherein:
the network traffic is received at the one or more input interfaces, and the network traffic is not provided to the one or more other network devices by the one or more output interfaces based on the first rule; and
a designated device failure detector configured to determine that the second network device has failed, and in response to determining that the second network device has failed, remove the first rule so that said network device distributes network traffic to the one or more other network devices.

17. A network device comprising:
one or more input interfaces configured to receive network traffic from a source; one or more output interfaces configured to distribute the network traffic to one or more other network devices;
means for preventing the network traffic from travelling from said network device to the one or more other network devices when a second network device is designated to receive and to distribute the network traffic to the one or more other network devices, wherein:
the network traffic is received at the one or more input interfaces, and the network traffic is not provided to the one or more other network devices by the one or more output interfaces based on the means for preventing the network traffic from travelling from said network device to the one or more other network devices; and
means for determining that the second network device has failed, and in response to determining that the second network device has failed, removing the first rule so that said network device distributes network traffic to the one or more other network devices.

18. A non-transitory computer-readable storage medium having stored thereon computer executable instructions for performing a method of configuring a network device, wherein the instructions, when executed by said network device, cause said network device to be operable for:
configuring said network device with a first rule, the first rule preventing network traffic from travelling from said network device to one or more other network devices;
configuring said network device to receive and distribute network traffic to the one or more other network devices as a failsafe to a second network device that receives and distributes the network traffic to the one or more other network devices, wherein:
the network traffic to the one or more other network devices is received at an incoming interface of the network device,
the network traffic to the one or more other network devices is not provided to the one or more other network devices by an outgoing interface of the network device based on the first rule;
determining that the second network device has failed; and
in response to determining that the second network device has failed, removing the first rule so that the network device distributes network traffic to the one or more other network devices.

19. A method of configuring a first network device comprising: configuring the first network device with a first rule, the first rule preventing
network traffic from travelling from the first network device to one or more other network devices;
configuring the first network device to receive and distribute network traffic to the one or more other network devices, wherein a second network device receives and distributes the network traffic to the one or more other network devices, wherein:
the network traffic to the one or more other network devices is received at an incoming interface of the first network device,
the network traffic to the one or more other network devices is not provided to the one or more other network devices by an outgoing interface of the first network device based on the first rule;

determining that the second network device has failed; and in response to determining that the second network device has failed, removing the first rule so that the first network device distributes network traffic to the one or more other network devices.

\* \* \* \* \*